Patented June 5, 1951

2,556,075

UNITED STATES PATENT OFFICE 2,556,075

METHOD OF POLYMERIZING GLYCIDYL COMPOUNDS

John G. Erickson, Greenwich, Conn., assignor to American Cyanamid Company, New York, N. Y., a corporation of Maine No Drawing. Application June 19, 1948, Serial No. 34,142

4 Claims. (Cl. 260—88.3)

This invention relates to a method of polymerizing glycidyl compounds, and more particularly to a method of polymerizing glycidyl compounds represented by the following general formula:

I 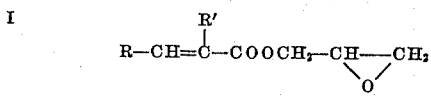

where R and R' each represents a member of the class consisting of hydrogen and the methyl radical, R' representing hydrogen when R represents a methyl radical. Glycidyl compounds which are embraced by the above formula are glycidyl acrylate, glycidyl methacrylate and glycidyl crotonate.

The unsaturated glycidyl compounds constitute a class of polymerizable materials which can be caused to polymerize either through the ethylenically unsaturated bond of the compound (more particularly through a vinyl grouping in the case of glycidyl acrylate) or through both the unsaturated linkage and the epoxy grouping. By suitable choice of catalysts, polymerization can be caused to take place primarily through the epoxy grouping. These polymerizable monomers also may be copolymerized with other polymerizable monomers, e. g., styrene, methyl methacrylate, vinyl acetate, etc., to yield new copolymers which have particular utility in the plastics art. Such copolymer compositions are more fully described and are specifically claimed in the copending application of John G. Erickson and Walter M. Thomas, Serial No. 34,143, filed concurrently herewith.

It is a principal object of the present invention to provide a new and useful method of polymerizing glycidyl compounds of the kind embraced by Formula I, more particularly compounds represented by the formula II 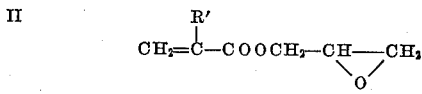

where R' represents a member of the class consisting of hydrogen and the methyl radical. Compounds embraced by Formula II are glycidyl acrylate and glycidyl methacrylate. This object is fulfilled, in accordance with the invention herein disclosed and claimed, by polymerizing such glycidyl compounds in the presence of (that is, in contact with) iodine as a polymerization catalyst.

At least two different methods may be employed to produce the monomeric chemical compounds with the polymerization of which this invention is concerned. For example, they may be prepared by effecting reaction between epichlorohydrin and an alkali-metal (sodium, potassium, lithium, rubidium or caesium) salt, preferably the potassium salt, of acrylic acid, methacrylic acid or crotonic acid, the reaction advantageously being effected in the presence of a material which is adapted to inhibit polymerization through the ethylenically unsaturated grouping, more particularly a vinyl-type polymerization inhibitor. The alkali-metal salt of the unsaturated monocarboxylic acid and the epichlorohydrin are used in the ratio of 1 mole of the former to at least 1 mole of the latter. Preferably the epichlorohydrin is used in excess of equimolecular proportions, e. g., in the ratio of, say, 1.05 or 1.1 to 2, 3, 4 or 5 moles of epichlorohydrin per mole of potassium or other alkali-metal salt of the unsaturated acid. If desired, the epichlorohydrin may be employed in even higher molar ratios, e. g., in the ratio of 10 or 15 or even as much as 20 or 30 or more moles of epichlorohydrin per mole of the alkali-metal salt. The excess of epichlorohydrin over stoichiometrical proportions merely acts as a solvent medium in which the reaction is effected, from which it will be seen that the maximum amount of epichlorohydrin used is governed only by practical considerations of processing economy. Usually it is desirable to employ the epichlorohydrin in an amount corresponding to at least 5 to 10 mole per cent in excess of equimolecular proportions.

The temperature of the reaction may be varied as desired or as conditions may require. Generally, the reaction is effected under reflux at the boiling temperature of the reaction mass using an excess of epichlorohydrin as a solvent medium in which the reaction is effected.

In order to obviate or minimize the formation of polymeric material during the reaction period, it is generally desirable to have present in the reaction mass a polymerization inhibitor of the aforementioned type or kind. Any suitable inhibitor of polymerization through an ethylenically unsaturated grouping may be employed, e. g., hydroquinone, phenyl-α-naphthylamine, N,N'-di-2-naphthyl-p-phenylenediamine, finely divided copper, certain cupric salts, e. g., cupric acetate, etc. The amount of the polymerization inhibitor may be considerably varied, but ordinarily it is employed in an amount not exceeding 3%, generally less than 1%, by weight of the mixed reactants, e. g., from 0.01% to 0.5 or 0.6% by weight of the mixture of starting materials.

At the end of the reaction period the unsaturated glycidyl compound is isolated from the reaction mass, e. g., by distillation, and more particularly by distillation under reduced pressure.

Another method by which the polymerizable monomers of this invention may be prepared is more fully described and claimed in my copending application Serial No. 34,141, filed concurrently herewith. As applied to the preparation of unsaturated glycidyl compounds, this method involves the dehydrohalogenation of 2-hydroxy-3-halogenopropyl acrylate, methacrylate or crotonate, more particularly by the dehydrochlorination of 2-hydroxy-3-chloropropyl acrylate, methacrylate or crotonate, which latter are prepared, for instance, by effecting reaction between acrylyl, methacrylyl or crotonyl chloride and glycerol-$\alpha$-monochlorohydrin. For example, 2-hydroxy-3-chloropropyl acrylate was obtained in a yield of 73% by effecting reaction between acrylyl chloride and glycerol-$\alpha$-monochlorohydrin in acetonitrile solution using a tertiary amine, specifically triethylamine, as a hydrohalide acceptor.

The monomers embraced by Formula I have been found to be stable (i. e., they do not polymerize) for periods of three months and longer at 5° C.

In order that those skilled in the art better may understand how the present invention may be carried into effect, the following examples are given by way of illustration and not by way of limitation. All parts and percentages are by weight. Some of the examples which follow show the use of materials other than iodine as catalysts for the polymerization of glycidyl compounds of the kind embraced by Formula I.

PREPARATION OF MONOMERS

*Example 1*

This example illustrates the preparation of glycidyl acrylate.

|  | Parts |
|---|---|
| Potassium acrylate | 55 |
| Epichlorohydrin | 235 |
| Polymerization inhibitor, specifically hydroquinone | 1 | were stirred and heated together under reflux at the boiling temperature of the mass (118° C.) for 23 hours. The resulting reaction mass was then cooled and filtered. The filtrate was distilled under reduced pressure to yield 22.8 parts of glycidyl acrylate, B. P. 115° C. at 78 mm. pressure. The product is a colorless liquid; $n_D^{20}=1.4472$; $d_4^{20}=1.0993$.

*Example 2*

This example illustrates the preparation of glycidyl acrylate by a method which is different from that described under Example 1.

A solution of 32.9 parts of 2-hydroxy-3-chloropropyl acrylate in about 53.5 parts of absolute ethyl ether was added to a suspension of 22.9 parts of sodium tert.-butoxide in about 214 parts of absolute ethyl ether. The mixture was stirred at room temperature (20°–30° C.) for 3 hours, filtered and distilled under a pressure of 65–70 mm. Redistillation of the distillate under reduced pressure yielded 8.3 parts of glycidyl acrylate, B. P. 98°–100° C. at 65 mm. pressure; $n_D^{20}=1.4472$, $d_4^{20}=1.0993$

*Example 3*

This example illustrates the preparation of glycidyl methacrylate.

The same procedure was followed as described under Example 1 with the exception that 62 parts of potassium methacrylate was used in place of 55 parts of potassium acrylate, and 2 parts instead of 1 part of hydroquinone was employed. Distillation of the filtrate under reduced pressure gave 46 parts of glycidyl methacrylate, B. P. 57°–59° C. at 3 mm. pressure. Glycidyl methacrylate is a colorless liquid, $n_D^{20}=1.4506$, $d_4^{20}=1.0760$.

*Example 4*

This example illustrates the preparation of glycidyl methacrylate by the dehydrochlorination of 2-hydroxy-3-chloropropyl methacrylate.

A solution of 25 parts of 2-hydroxy-3-chloropropyl methacrylate in about 107 parts of absolute ethyl ether was added to a suspension of 13.7 parts of sodium tert.-butoxide in about 158 parts of tert.-butyl alcohol. The mixture was stirred for 1 hour at room temperature and filtered. Distillation of the filtrate under reduced pressure gave 10.5 parts of glycidyl methacrylate; B. P. 65° C. at 5 mm. pressure, $n_D^{20}=1.4506$, $d_4^{20}=1.0760$.

*Example 5*

This example illustrates the preparation of glycidyl crotonate by effecting reaction between an alkali-metal crotonate and epichlorohydrin.

Potassium crotonate (40.4 parts) and 200 parts of epichlorohydrin were heated together under reflux at the boiling temperature of the reaction mass for 29 hours, after which the mass was filtered. Distillation of the filtrate under reduced pressure yielded 28.2 parts of glycidyl crotonate, B. P. 102°–104° C. at 18 mm. pressure, $n_D^{25}=1.4568$.

PREPARATION OF POLYMERS

Polymerization of monomers (or mixtures of monomers) of the kind embraced by Formula I, specifically glycidyl methacrylate, will proceed merely by allowing the material to stand for a prolonged period, e. g., from 4 to 8 weeks or longer, at room temperature (20° to 30° C.), the polymerization proceeding mainly through opening up of the epoxy grouping. This type of polymerization (i. e., polymerization as a result of rupturing of the epoxy grouping) is accelerated by heating the monomeric material, e. g., at temperatures up to and including the boiling point of the monomer (or mixture of monomers) at atmospheric pressure, using reflux conditions or a pressure slightly above atmospheric if polymerization is effected at the boiling point of the monomer. Polymerization may be effected, if desired, at superatmospheric pressures ranging, for example, from 5 to 40 pounds per square inch above atmospheric, in which case the temperature of polymerization is slightly above the boiling point of the monomer.

Light also may be used to effect polymerization, although the rate of polymerization is relatively slow. Ultraviolet light is more effective than ordinary light. A combination of heat and light usually causes more rapid polymerization than light alone.

The polymerization of the glycidyl ester or mixture thereof is preferably accelerated by incorporating a single or a plurality of polymerization catalysts therein. The polymerization catalyst may be so chosen as to cause the polymerization to proceed wholly or mainly through the ethylenically unsaturated grouping of the ester. In this way there is produced a reactive polymer which then can be caused to polymerize further through opening up of the epoxy grouping of the glycidyl ester. If desired, partial polymerization of the ester may be effected with the aid of one polymerization catalyst (e. g., a peroxide and, more particularly, an organic peroxide catalyst) and polymerization then completed with the aid of a catalyst capable of opening up the epoxy grouping, e. g., stannic chloride, etc.

Any of the polymerization catalysts which are suitable for use in polymerizing compounds containing an ethylenically unsaturated grouping, specifically a vinyl grouping, may be employed. Among the preferred catalysts are: the acidic peroxides, e. g., benzoyl peroxide, phthalic peroxide, succinic peroxide and benzoyl acetyl peroxide, as well as fatty oil acid peroxides, e. g., coconut oil acid peroxides, lauric peroxide, stearic peroxide and oleic peroxide; alcoholic peroxides, e. g., tert.-butyl hydroperoxide; and terpene oxides, e. g., ascaridole. Other and more specific examples of organic peroxide catalysts that may be employed are the following:

Tetralin hydroperoxide
Tert.-butyl diperphthalate
Cumene hydroperoxide
Tert.-butyl perbenzoate
Acetyl peroxide
2,4-dichlorobenzoyl peroxide
Urea peroxide
Caprylyl peroxide
p-Chlorobenzoyl peroxide
Di-tert.-butyl peroxide
2,2-bis(tert.-butyl peroxy) butane
Hydroxyheptyl peroxide
Diperoxide of benzaldehyde Examples of catalysts which accelerate polymerization primarily by opening up of the epoxy grouping and, also, may cause polymerization to proceed through the ethylenically unsaturated grouping are: p-toluene sulfonic acid, sulfuric acid, phosphoric acid, aluminum chloride, stannic chloride, ferric chloride, boron trifluoride, boron trifluoride-ethyl ether complex, iodine, etc. The invention claimed herein is concerned specifically with the use of iodine as a catlayst for accelerating the polymerization of glycidyl compounds of the kind embraced by Formula I.

The concentration of the catalyst employed is usually small, that is, for the preferred catalysts from, by weight, about 1 part of catalyst per thousand parts of the glycidyl ester or mixture of glycidyl esters to be polymerized to about 3 or 4 parts of catalyst per hundred parts of the said ester or mixture of esters. If an inhibitor of the kind aforementioned be present, up to 6 or 7% or even more, based on the weight of the polymerizable composition, may be necessary according to the concentration of the inhibitor.

The polymerization may be effected by conventional bulk polymerization technique, in the presence or absence of a solvent capable of dissolving the glycidyl ester and in which the latter preferably is inert; or by conventional emulsion polymerization or bead polymerization methods. Polymerization may be effected by a continuous process as well as by a batch operation. Thus the glycidyl ester containing a trace of catalyst may be passed through a conduit with alternate hot and cool zones.

The temperature of polymerization of the monomer or mixture of monomers, at atmospheric or slightly above atmospheric pressure and in the presence or absence of a polymerization catalyst, may be varied over a wide range, up to and including or slightly above the boiling point (at atmospheric pressure) of the monomeric material as previously has been more fully described. In most cases the polymerization temperature will be within the range of 15° C. to 140° C., more particularly within the range of 20° C. or 30° C. (ordinary room temperature) to 130° C., depending upon the particular glycidyl ester or mixture of glycidyl esters employed, the particular catalyst, if any, used, the rapidity of polymerization wanted, and other influencing factors. With certain catalysts, more particularly strong acidic polymerization catalysts such, for instance, as gaseous boron trifluoride, boron trifluoride-ethyl ether complex, concentrated sulfuric acid, anhydrous aluminum chloride, etc., a substantially lower polymerization temperature often advantageously may be used, e. g., temperatures ranging between −80° C. and 0° C. or 10° C. At the lower temperatures below the solidification point of the monomeric glycidyl ester, polymerization is effected while the monomer is dissolved or dispersed in a solvent or dispersion medium which is liquid at the polymerization temperature. Or, if desired, the ester may be polymerized in dissolved or dispersed state at temperatures above its solidification point. The polymer may be separated from the liquid medium in which it was polymerized by any suitable means, e. g., by filtration, centrifuging, solvent extraction, etc.

In some cases it may be desirable to incorporate with the monomeric glycidyl ester or mixture of esters an inhibitor which is adapted to inhibit polymerization through the ethylenically unsaturated grouping. When it is desired to use this mixture a catalyst is added in an amount sufficient to promote the polymerization and to yield a polymeric or copolymeric material. By careful control of the concentrations of inhibitor and catalyst, a uniform product is obtainable with a good reaction velocity. Any suitable polymerization inhibitor of the aforementioned type or kind may be employed, e. g., phenyl-$\alpha$-naphthylamine, N,N′-di-2-naphthyl-p-phenylenediamine, certain cupric salts, e. g., cupric acetate, etc. The amount of the polymerization inhibitor may be considerably varied, but ordinarily it is employed in an amount not exceeding 3%, generally less than 1%, by weight of the glycidyl ester or esters, e. g., from 0.01% to 0.5 or 0.6% by weight of the said ester or esters.

The monomeric esters are normally liquids and, therefore, may be cast at normal temperatures in film or bulk form. Upon being subjected to polymerization conditions as above described, hard polymeric films or massive castings or moldings are obtained. Alternatively, the monomeric esters may be partially polymerized, mainly through the ethylenically unsaturated grouping, to yield a solid thermosetting (or potentially thermosetting) polymer. This polymer, alone or with a modifier or a plurality of modifiers, e g., a pigment, dye, opacifier, filler, polymerization catalyst, mold lubricant, etc., may be used in the production of molding compositions from which molded articles of any desired shape may be fabricated. Molding is effected under heat and pressure. During molding, cross-linking takes place as a result of opening up of the epoxy ring of the reactive polymer under the heat of molding and/or the influence of a polymerization catalyst that may have been incorporated into the the molding composition in order to promote or accelerate this effect. In this way there can be produced molded articles formed of filled or unfilled polymeric ester cured to an insoluble, infusible or insoluble and infusible form or state.

When organic peroxide polymerization catalysts are employed, the unfilled castings or moldings of the polymeric esters, especially glycidyl acrylate and methacrylate, are clear or substantially clear, colorless or nearly colorless, and at an advanced stage of polymerization are hard, tough polymers having considerable resistance to abrasion.

The reactive, thermosetting (or potentially thermosetting) polymers, and more particularly those polymers which are capable of undergoing further polymerization through opening up of the epoxy groupings, are particularly valuable in the plastics art, e. g., in the production of filled or unfilled molding compositions from which latter molded articles are produced by molding the composition under heat and pressure as hereafter more fully described. In such polymeric materials, polymerization through the vinyl grouping may or may not have proceeded to substantial completion, depending upon the extent of polymerization that was desired and which is attained by suitable control of the polymerization conditions, e. g., kind of polymerization catalyst used, time and temperature of polymerization, etc. Further polymerization of the reactive polymer through opening up of the epoxy groupings then can be effected, e. g., during a molding operation, either by means of heat alone, a polymerization catalyst alone, or by the use of both heat and a polymerization catalyst.

Any suitable temperature may be used to rupture the epoxy groupings of the reactive polymers, but usually the temperatures required, when heat alone is used to accelerate polymerization, are higher than those which will cause the corresponding monomer to polymerize through the epoxy grouping. For example, in the absence of a polymerization catalyst, a temperature of at least 105° C. is generally required in order to open up the epoxy grouping of a reactive polymerization product of this invention and thereby to effect further polymerization of the material. The polymerization proceeds more rapidly through the epoxy grouping as higher temperatures are used, e. g., 110° or 120° C. to 200° C. or higher and, also, if a polymerization catalyst adapted to accelerate polymerization through the epoxy grouping, examples of which catalysts have been given hereinbefore, be incorporated in the reactive polymer prior to the heat treatment. Polymerization of the reactive polymer at normal temperatures also may be effected by using a polymerization catalyst alone.

The following examples are illustrative of the preparation of polymerization products from monomers and mixtures of monomers of the kind embraced by Formula I:

*Example 6*

| | Parts |
|---|---|
| Glycidyl methacrylate | 100.0 |
| Benzoyl peroxide | 0.5 | are mixed together and charged to a heavy-walled glass tube, which thereafter is sealed under vacuum. Polymerization of the glycidyl ester is allowed to proceed for 400 hours at room temperature (20° to 30° C.) and then for 15 days at 60° C. A very hard, clear, bubble-free, crack-free polymer of glycidyl methacrylate is obtained.

The catalyzed glycidyl methacrylate monomer or partial polymer may be cast and polymerized to yield cast articles of various shapes for industrial and household uses or for ornamental and decorative purposes. Or, the monomer may be used as a solventless varnish. For instance, a polymerizable composition comprising glycidyl methacrylate and a suitable polymerization catalyst, e. g., benzoyl peroxide or other organic peroxide, numerous examples of which have been given hereinbefore, may be used in impregnating electrical coils. Since polymerization of the liquid monomer advances to solid state without the volatilization of any solvent and the formation of voids in the solid polymer, the impregnated coil is more resistant to electrical breakdown under electrical stress than are coils which have been impregnated with a liquid impregnant containing a volatile solvent and then baked to volatilize the solvent and to solidify the impregnant.

*Example 7*

| | Parts |
|---|---|
| Glycidyl acrylate | 100.0 |
| Benzoyl peroxide | 0.5 |

The same procedure is followed as described under Example 6, yielding a soft, honey-colored mass of polymeric glycidyl acrylate.

*Example 8*

| | Parts |
|---|---|
| Glycidyl acrylate | 100.0 |
| Toluene (dry) | 100.0 |

The glycidyl acrylate is dissolved in the toluene and the resulting solution is charged to a quartz vessel. After 20 hours of irradiation from a strong source of ultraviolet light, a mass of swollen polymer of glycidyl acrylate separates from the solution. This reactive polymer of glycidyl acrylate is capable of undergoing further polymerization through opening up of the epoxy grouping, for example by mixing 2 parts of stannic chloride with the swollen polymer, thereby to obtain a solid glycidyl acrylate polymer wherein further polymerization has taken place through the epoxy grouping.

*Example 9*

Same as Example 8 with the exception that 100 parts of glycidyl methacrylate is substituted for 100 parts of glycidyl acrylate. The resulting swollen polymer of glycidyl methacrylate likewise is reactive and is capable of undergoing further polymerization through the epoxy grouping as described under Example 8 by way of illustration with reference to a reactive polymer of glycidyl acrylate.

The swollen polymers of glycidyl acrylate and glycidyl methacrylate of Example 8 and 9 may be heated under reduced pressure at 90° C. to volatilize the retained toluene and to further advance the polymerization of these esters. Heating under vacuum for from 1 to 2 hours at 90° C. is usually sufficient to remove the residual toluene and to advance the polymerization to a satisfactory degree. For the same period of heating of the toluene-free polymer, the polymer of glycidyl methacrylate is harder than the glycidyl acrylate polymer.

*Example 9a*

| | Parts |
|---|---|
| Glycidyl acrylate | 50.0 |
| Glycidyl methacrylate | 50.0 |
| Benzoyl peroxide | 0.5 | are mixed together and polymerized as described under Example 6. The hardness of the resulting copolymer is about intermediate between that of the polymeric glycidyl methacrylate of Example 6 and the polymeric glycidyl acrylate of Example 7.

*Example 10*

| | Parts |
|---|---|
| Glycidyl methacrylate | 90 to 95 |
| Glycidyl acrylate | 10 to 5 |
| Benzoyl peroxide | 0.5 | are mixed together and polymerized as described under Example 6, yielding a clear copolymer of glycidyl acrylate and glycidyl methacrylate which is not quite so hard as the polymeric glycidyl methacrylate of Example 6.

*Example 11*

| | Parts |
|---|---|
| Glycidyl acrylate | 90 to 95 |
| Glycidyl methacrylate | 10 to 5 |
| Benzoyl peroxide | 0.5 | are mixed together and polymerized as described under Example 6, yielding a glycidyl acrylate-glycidyl methacrylate copolymer which is somewhat harder than the polymeric glycidyl acrylate of Example 7.

*Example 12*

| | Parts |
|---|---|
| Glycidyl methacrylate | 90.0 |
| Glycidyl acrylate | 5.0 |
| Glycidyl crotonate | 5.0 |
| Benzoyl peroxide | 0.5 | are mixed together and copolymerized as described under Example 6, yielding a copolymer glycidyl acrylate, glycidyl methacrylate and glycidyl crotonate which is not quite so hard as the polymeric glycidyl methacrylate of Example 6.

*Example 13*

| | Parts |
|---|---|
| Glycidyl crotonate | 50 |
| Boron trifluoride-ethyl ether complex | 1 |

The glycidyl crotonate is treated at room temperature with the boron trifluoride-ethyl ether complex in a glass container. The gel that forms upon contact of the ester with the catalyst dissolves in the monomer, yielding a viscous solution. On warming slightly (60° C.) the entire mass is first converted to a yellow, opaque gel and then suddenly reacts exothermically to form a rubbery polymer of glycidyl crotonate.

*Example 14*

| | Parts |
|---|---|
| Glycidyl methacrylate | 50 |
| Stannic chloride | 1 |

A vigorous reaction takes place upon adding the stannic chloride to the glycidyl methacrylate at room temperature, yielding a polymer of glycidyl methacrylate in the form of a gel.

*Example 15*

Same as Example 14 with the exception that 1 part of boron trifluoride-ethyl ether complex is used instead of 1 part of stannic chloride. A vigorous reaction immediately occurs, forming a gelled polymer of glycidyl methacrylate.

*Example 16*

Same as Example 14 with the exception that 1 part of iodine is used in place of 1 part of stannic chloride. A brown color is imparted to the monomeric glycidyl methacrylate, but no other change is immediately apparent. After standing for about 6 weeks at room temperature, the mass becomes colorless and sets to a clear, hard gel of polymeric glycidyl methacrylate.

*Example 17*

| | Parts |
|---|---|
| Glycidyl methacrylate | 20.0 |
| Benzene (dry) | 20.0 |
| Benzoyl peroxide | 0.1 | are heated together under reflux at the boiling temperature of the mass for 30 minutes, yielding a clear viscous solution. Three drops of $BF_3$-etherate (boron trifluoride-ethyl ether complex) are added to 5 cc. of the resulting solution. A hard, white gel forms on contact of the catalyst with the solution. This indicates that vinyl-type polymerization first occurs under the influence of the peroxide catalyst. This is then followed by cross-linking of the initial polymer due to the opening up of the epoxy groupings thereof by the $BF_3$-etherate catalyst.

The thermosetting or potentially thermosetting, reactive polymeric and copolymeric esters described hereinbefore have a wide variety of applications. For instance, with or without a filler or other additive, numerous examples of which have been given hereinbefore, they may be used as molding compositions (or as components of molding compositions) from which molded articles are produced by molding the composition under heat and pressure, e. g., at temperatures of the order of 120° C. to 200° C. and under pressures ranging between 1000 and 10,000 pounds per square inch. Among the fillers that may be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable esters (or mixtures thereof) also may be employed in the production of castings. The liquid monomers or partial polymers also may be used as adhesives, for instance in the production of optical devices containing a plurality of elements, examples of which are compound lenses, compound prisms, Nicol prisms, etc.

The monomers embraced by Formula I are especially valuable in the production of copolymer compositions as more fully described and specifically claimed in the copending application of John G. Erickson and Walter M. Thomas, Serial No. 34,143, filed concurrently herewith.

I claim:

1. The method which comprises polymerizing, in the presence of iodine as a polymerization catalyst, a compound represented by the general formula $$R-CH=\overset{R'}{\underset{|}{C}}-COOCH_2-CH\underset{O}{\overset{\diagdown \diagup}{-}}CH_2$$

where R and R' each represents a member of the class consisting of hydrogen and the methyl radical, R' representing hydrogen when R represents a methyl radical.

2. The method of preparing a homopolymer of glycidyl methacrylate which comprises adding to the monomer a small amount of iodine.

3. The method which comprises adding to glycidyl methacrylate at room temperature a small amount of iodine, and allowing the resulting mixture to remain at room temperature until the said glycidyl methacrylate has polymerized to the desired degree.

4. The method which comprises forming an admixture at room temperature of glycidyl methacrylate and iodine in a weight ratio of 50 parts of the former to 1 part of the latter, and allowing the resulting mass to remain at room temperature until the said mass has set to a clear, hard gel of polymeric glycidyl methacrylate.

JOHN G. ERICKSON.

REFERENCES CITED

The following references are of record in the file of this patent:

UNITED STATES PATENTS

| Number | Name | Date |
|---|---|---|
| 2,089,569 | Orthner et al. | Aug. 10, 1937 |
| 2,129,666 | Barrett et al. | Sept. 13, 1938 |
| 2,335,813 | Stein | Nov. 20, 1943 |
| 2,470,324 | Staudinger et al. | May 17, 1949 |
| 2,476,922 | Shokal et al. | July 19, 1949 |

FOREIGN PATENTS

| Number | Country | Date |
|---|---|---|
| 518,057 | Great Britain | Feb. 15, 1940 |

OTHER REFERENCES

Kester et al.: "Glycidyl Esters of Aliphatic Acids," 8 J. Org. Chem. 550–556 (1943).